United States Patent
Seegopaul et al.

(10) Patent No.: US 6,524,366 B1
(45) Date of Patent: Feb. 25, 2003

(54) METHOD OF FORMING NANOGRAIN TUNGSTEN CARBIDE AND RECYCLING TUNGSTEN CARBIDE

(75) Inventors: Purnesh Seegopaul, Flemington, NJ (US); Lin Gao, Piscataway, NJ (US)

(73) Assignee: N.V. Union Miniere S.A., Brussels (BE)

( * ) Notice: Subject to any disclaimer, the term of this patent is extended or adjusted under 35 U.S.C. 154(b) by 0 days.

(21) Appl. No.: 09/668,114

(22) Filed: Sep. 22, 2000

(51) Int. Cl.[7] ............................................... C22B 34/36
(52) U.S. Cl. ........................ 75/351; 75/353; 75/371; 148/217; 148/237; 423/440
(58) Field of Search .................. 75/351, 353, 371; 148/217, 237; 423/440

(56) References Cited

U.S. PATENT DOCUMENTS

| | | |
|---|---|---|
| 3,077,385 A | 2/1963 | Robb |
| 4,172,808 A | 10/1979 | Boohm et al. |
| 4,190,439 A | 2/1980 | Gortsema |
| 4,234,333 A * | 11/1980 | Ghandehari et al. ........ 205/557 |
| 4,851,206 A | 7/1989 | Boudart et al. |
| 5,230,729 A | 7/1993 | McCandlish et al. |
| 5,352,269 A | 10/1994 | McCandlish et al. |
| 5,372,797 A | 12/1994 | Dunmead et al. |
| 5,613,998 A | 3/1997 | Seegopaul et al. |
| 5,704,994 A * | 1/1998 | Kuwabara et al. .......... 148/217 |
| 5,728,197 A | 3/1998 | Seegopaul et al. |
| 5,912,399 A * | 6/1999 | Yu et al. ....................... 75/351 |
| 5,919,428 A | 7/1999 | Gao et al. |
| 6,293,989 B1 * | 9/2001 | Kim et al. .................... 75/351 |

FOREIGN PATENT DOCUMENTS

EP       846658 A1 *  6/1998

OTHER PUBLICATIONS

F. H. Ribeiro et al, *Preparation and Surface Composition of Tungsten Carbide Powders with High Specific Surface Area*, 1991 American Chemical Society, 805–812.
*Refractory Hard Metals, Tungsten Carbides*, Macmillan, New York, 1953.

* cited by examiner

*Primary Examiner*—George Wyszomierski
(74) *Attorney, Agent, or Firm*—Wood, Herron & Evans, LLP

(57) ABSTRACT

Tungsten carbide is formed from a tungsten material which is preferably tungsten carbide scrap. If scrap material is used, this is oxidized and acid leached to remove impurities and any binder material. This is then dissolved in a solution of sodium hydroxide and spray dried to form a precursor compound. A carbon compound such as citric acid can be added to the solution prior to spray drying to provide a carbon source for the tungsten carbide. The powder formed from the spray dried solution is calcined and carburized to form tungsten carbide.

9 Claims, No Drawings

METHOD OF FORMING NANOGRAIN TUNGSTEN CARBIDE AND RECYCLING TUNGSTEN CARBIDE

BACKGROUND OF THE INVENTION

Tungsten carbide is used in a wide variety of products such as cutting tools, wear parts and mining drill bits. Its toughness and hardness makes it excellent for these applications. In order to improve the hardness of tungsten carbide, the grain size of the carbide should be as small as possible. It is known that nanograin size tungsten carbide powders can be produced by a combination reduction carburization process. This permits the tungsten carbide to be used in very demanding applications. One such process of forming tungsten carbide is disclosed in Gao, U.S. Pat. No. 5,919,428. This requires very careful control of operating parameters. Other processes used to manufacture nanophase tungsten carbide as well as tungsten carbide cobalt composites also typically involve several processing steps including reductive decomposition and gas phase carburization. Unintentional formation of stable intermediates in these processes significantly increases the carburization cycle time. Further, most of these products are not particularly well suited for recycling scrap tungsten carbide. Generally it is desirable to recycle spent or unused scrap tungsten carbide for both environmental and cost reasons.

There are several processes currently used to recycle tungsten carbide and tungsten products. These processes include the zinc process, the cold stream process, an alkaline leach process, chlorination systems, electrolysis and high temperature smelting. With the exception of the zinc and the cold stream process, the other chemical methods involve numerous conversion extraction and precipitation steps that increase the cycle time.

The zinc and cold stream process do permit a direct conversion into useful powder but material purity is a problem and thus the application of this type of reclaimed material is extremely limited. Seegopaul U.S. Pat. No. 5,613,998 and Seegopaul U.S. Pat. No. 5,728,197, both disclose methods of reclaiming scrap tungsten carbide and using this to form cobalt tungsten carbide composites. The methods utilized to form cobalt tungsten carbide composites are very different than methods used to form tungsten carbide per se. Basically the carbothermic process typically used to make tungsten carbide cobalt composites will not form nanoscale tungsten carbide. In the carbothermic process, the presence of the cobalt helps catalyze the decomposition of carbon monoxide to promote carburization. Thus, there is currently no method suitable to both reclaim tungsten carbide and at the same time use this to form small grain tungsten carbide particles.

SUMMARY OF THE INVENTION

The present invention is premised on the realization that a tungsten salt such as ammonium tungstate can be formed into particles which can then be calcined in nitrogen or air and then subsequently subjected to a gas phase carburization to form tungsten carbide powder. This will form a nanograin size powder with grain sizes less than 50 nanometers. Grains can then be formed by utilizing a high temperature annealing process.

In particular the present invention can utilize scrap tungsten carbide by oxidizing the tungsten carbide to form a mixture of tungsten yellow oxide ($WO_3$), and cobalt tungstate, if cobalt is in the starting material. This is then subjected to an acid leach which will remove binder metals such as cobalt and nickel leaving a mixture of tungsten trioxide and tungstic acid. This is digested with a base such as ammonium hydroxide to dissolve the tungsten which is spray dried. The spray dried particles form an excellent source material for the calcination carburization formation of tungsten carbide particles.

The objects and advantages of the present invention will be further appreciated in light of the following detailed description.

DETAILED DESCRIPTION

The present invention is a method of forming tungsten carbide and will be disclosed with respect to its preferred embodiment which utilizes scrap tungsten carbide as a starting material. However, it should be stated that the present invention can use any tungsten salt as a starting material and does not require utilization of tungsten carbide scrap as a starting material.

The first step of the present invention is to convert the scrap tungsten into oxide powder. Tungsten material that can be used in the present invention includes elemental tungsten, tungsten oxides, tungsten-copper, tungsten-silver, tungsten nitride, tungsten boride, tungsten salenide, tungsten sulfide, tungsten silicide and tungsten carbide which can be found either with a binder such as cobalt, nickel or iron or without the binder.

This material would generally be waste tungsten carbide and is referred in the industry as hard scrap or soft scrap. Hard scrap is previously sintered material and soft scrap is unsintered powder. Hard scrap should be crushed to a small size suitable for loading into a rotary furnace. While it is preferred that the crushed size be down to a few millimeters to increase the reaction rate, fragments in the range of 1 to 6 inches can also be utilized. It may be preferred to subject the scrap to a pre-oxidation treatment such as a washing to remove surface contaminations. But this should not be necessary in the present invention.

The scrap particles are then oxidized preferably by heating to a temperature of 600° to 1050° C. in the presence of air for a period of 10 to 24 hours. As a general rule, high oxidation temperatures shorten the oxidation time. Coated scrap will also require a higher oxidation temperature than powder or uncoated scrap. The scrap can be converted in any furnace which utilizes flowing air. However, the rotary furnace with flowing air is preferred due to the grinding action provided by the rotation of the furnace.

The oxidation forms tungsten trioxide, also referred to as tungsten yellow. If a binder is present such as cobalt, the tungstate such as cobalt tungstate will be the reaction product, together with the oxide.

After the tungsten oxide and tungstate are formed, they are subjected to an acid leaching at a pH of less than 1. The preferred leaching agent is concentrated hydrochloric acid (230 g/l). This will act to dissolve binder elements such as cobalt or nickel as well as impurities to enable them to be separated from the oxide powder. Leaching is accomplished by elevating the temperature to boiling temperature in an acid resistant tank and leaving the oxide powder in the tank for a period of about 4 to about 16 hours with about twelve hours being preferred. Preferably the evaporated acid is recovered.

This will act to dissolve the binder as well as impurities leaving the tungsten in the form of tungsten trioxide or tungstic acid behind. The tungsten compound is then separated from the liquid acid by filtration. Binder metals can be recovered from the acid in a separate recovery process.

The recovered filter cake which is a mixture of tungsten trioxide and tungstic acid is then dried and preferably ground into a powder. Next the tungsten trioxide and tungstic acid are dissolved in a solution of ammonium hydroxide. Preferably the digestion utilizes a twenty-five (25%) percent ammonium hydroxide solution at about 90° C. for about ten hours. The digestion pressure is preferably superatmospheric generally 50 to 70 psig. The pH of the digested solution at room temperature will generally be above ten. If particulate material remains undissolved in the ammonium hydroxide solution, it should be removed by filtration. The filtered solution can be spray dried and formed into tungsten carbide directly or preferably the solution is treated with additional agents which will further facilitate formation of tungsten carbide.

In particular carbon containing compounds can be added to the solution so that when the solution is spray dried carbon atoms will be intimately associated with the tungsten atoms. In particular lower molecular weight i.e., water soluble carboxylic acids such as formic acid, ascorbic acid and citric acid can be added as well as amino acids. Generally any carbon containing composition which does not include other metals or other undesirable atoms and which will not evaporate during spray drying can be added to provide the carbon for the subsequent carburization. Preferably the amount of carbon composition added to the tungsten solution will be sufficient to establish a carbon concentration in the precursor compound of from about 1% to 15% carbon by weight. Additional carbon can be present. However, this may have to be driven off during the carburization process by reducing carbon activity in the gas. Preferably the precursor composition will have from about 4% to about 9% carbon by weight.

Cobalt compounds could also be added in the event one were attempting to form a cobalt tungsten carbide composite. The powder is then spray dried to form particles of a precursor compound which is essentially ammonium tungstate.

The ammonium tungstate precursor compound is then subjected to a calcination preferably in nitrogen or diluted air. The calcination is conducted at 600° to about 900° C. This eliminates moisture and organic impurities. Carburization can commence immediately after the desired temperature is achieved or the precursor can be soaked in the calcining gas for up to about two hours. Subsequent to calcination, the compound is carburized.

The carburization reaction is conducted by simply combining a carburization gas with the tungsten compound at elevated temperature for a period of time effective to form the tungsten carbide. Carburization temperature is generally in the range of 700° to 900° C. depending upon the calcined powder. A carbon containing precursor is easier to fully carburize than one without the carbon.

In order to carburize the precursor, there must be sufficient carbon available. The carbon is provided by raising the carbon activity of the gas to greater than 1 and preferably 1.5, by incorporating carbon into the precursor or both.

The commonly used gases for carburization are a mixture of hydrogen and carbon monoxide with a fixed ratio. Methane can be used to expedite the carburization process. Decarburization cycles using carbon dioxide may be required to remove free carbon deposited from the powder.

Preferably the carburization gas will be a mixture of hydrogen and carbon monoxide at a ratio of 70 to about 30. Carburization is actually a combination reduction carburization process. Different calcined powders will react differently because of the different kinetics between the reduction and carburization. Both reactions become faster at higher temperatures. However the temperature effects reduction more than carburization. If reduction outpaces carburization, the calcined powder will be reduced to tungsten metal before being carburized. Carburization of tungsten metal is then much more difficult than carburization of an oxide such as tungsten dioxide. To prevent this, a lower carburization temperature is preferred. However, lower temperatures slow down the reduction and increase the carbon activity of the synthesis gas with a fixed ratio of carbon monoxide to hydrogen. Thus, the preferred carburization temperature is 775° C. to 825° C.

The carburization process is usually conducted in a multi-staged operation in which the gas mixture can be changed from for example a carburization mix gas which has a high carbon activity to a decarburization gas which has a lower carbon activity. This will facilitate crystalline tungsten carbide formation and discourage leaving residual carbon in the tungsten carbide. Generally one to four cycles can be used with about four cycles being preferred.

After the carburization is complete, the tungsten carbide particles should have a grain size of less than 50 nanometers.

The invention will be further appreciated in light of the following detailed examples:

EXAMPLE 1

An acid leached oxide powder was heated to 810° C. in flowing $N_2$ and carburized at 810° C. with a flowing mixture of $H_2$, CO, $CH_4$ in about 69:29:2 (volume) ratio for 6 hours. After the carburization, the powder was cooled down in $N_2$ and passivated at room temperature with diluted air. The powder was converted to WC completely. The WC grain size of the powder was below 50 nm.

EXAMPLE 2

Three powders, $WO_3$, TBO, and a W precursor from the acid leaching process, were heated up in flowing $N_2$ to 775° C. and then carburized at 775° C. for four cycles. Each cycle includes 120 minute carburization with a flowing mixture of $H_2$, CO, $CH_4$ in about 68:29:3 ratio and 15 minute decarburization with flowing mixture of $H_2$, CO, $CO_2$ in about 57:25:18 ratio. After the carburization, the powders were cooled down in $N_2$ and passivated at room temperature with diluted air. Both $WO_3$ and the W precursor were converted to WC completely but TBO was not fully converted. The WC grain size of the converted powders was below 50 nm.

EXAMPLE 3

Three powders, $WO_3$, TBO, and a W precursor from the acid leaching process, were heated up in flowing $N_2$ to 800° C. and then carburized at 800° C. for four cycles. Each cycle includes 120 minute carburization with flowing mixture of $H_2$, CO, $CH_3$ in about 69:29:2 ratio and 15 minute decarburization with flowing mixture of $H_2$, CO, $CO_2$ in about 57:25:18 ratio. After the carburization, the powders were cooled down in $N_2$ and passivated at room temperature with diluted air. Both $WO_3$ and the W precursor were converted to WC completely but TBO was not fully converted. The WC grain size of the converted powders was below 50 nm.

EXAMPLE 4

A tungstate precursor from the acid leaching process was heated up in flowing $N_2$ to 775° C. and then carburized at 775° C. for four cycles. Each cycle includes 120 minute carburization with flowing mixture of $H_2$, CO in about 70:30 ratio and 30 minute decarburization with flowing mixture of $H_2$, CO, $CO_2$ in about 57:25:18 ratio. After the carburization, the powder was cooled down in $N_2$ and passivated at room temperature with diluted air. The powder was converted to WC completely without free carbon. The WC grain size of the powder was below 50 nm.

EXAMPLE 5

A tungstate precursor from the acid leaching process was heated up in flowing $N_2$ to 800° C. and then carburized at 800° C. for four cycles. Each cycle includes 120 minute carburization with flowing mixture of $H_2$, CO in about 70:30 ratio and 30 minute decarburization with flowing mixture of $H_2$, CO, $CO_2$ in about 57:25:18 ratio. After the carburization, the powder was cooled down in $N_2$ and passivated at room temperature with diluted air. The powder was converted to WC completely without free carbon. The WC grain size of the powder was below 50 nm.

EXAMPLE 6

Two tungstate precursor powders from the acid leaching process, one containing no carbon and the other containing about 2% carbon, were heated up in flowing $N_2$ to 825° C. and then carburized at 825° C. for four cycles. Each cycle includes 120 minute carburization with flowing mixture of $H_2$, CO, $CH_4$ in about 69:29:2 ratio and 30 minute decarburization with flowing mixture of $H_2$, CO, $CO_2$ in about 57:25:18 ratio. After the carburization, the powders were cooled down in $N_2$ and passivated at room temperature with diluted air. The 2% carbon-containing powder was converted to WC completely but the powder containing no carbon was not fully converted. The WC grain size of the converted powder was below 50 nm.

EXAMPLE 7

Three tungstate precursor powders from the acid leaching process, one containing no carbon and the other two containing about 4% and 9% carbon respectively, were heated up in flowing $N_2$ to 850° C. and then carburized at 850° C. in four cycles. Each cycle included a 120 minute carburization with flowing mixture of $H_2$, CO in about 70:30 ratio and 30 minute decarburization with a flowing mixture of $H_2$, CO, $CO_2$ in about a 57:25:18 ratio. After the carburization, the powders were cooled down in $N_2$ and passivated at room temperature with diluted air. The two carbon-containing precursor powders were converted to WC completely but the powder containing no carbon was not fully converted. The WC grain size of the converted powders was below 50 nm.

EXAMPLE 8

Three tungstate precursor powders from the acid leaching process, containing about 2%, 4% and 9% carbon respectively, were heated up in flowing $N_2$ to 860° C. and then carburized at 860° C. with a flowing mixture of $H_2$ and CO in about a 70:30 ratio in four cycles. Each cycle included a 120 minute carburization with flowing mixture of $H_2$, CO in about 57:25:18 ratio. After the carburization, the powders were cooled down in $N_2$ and passivated at room temperature with diluted air. The 4% and 9% carbon-containing powders were converted to WC completely but the 2% carbon-containing powder was not fully converted. The WC grain size of the converted powders was below 50 nm.

EXAMPLE 9

Two tungstate precursor powders from the acid leaching process, one containing about 2% carbon and the other about 9% carbon, were heated up in flowing $N_2$ to 875° C. and then carburized at 875° C. with flowing mixture of $H_2$ and CO in about 70:30 ratio for 6 hours. After the carburization, the powders were cooled down in $N_2$ and passivated at room temperature with diluted air. The 9% carbon containing powder was converted to WC completely but the 2% carbon containing powder was not fully converted. The WC grain size of the converted powder was below 50 nm.

Thus this demonstrates that the present invention is useful in forming tungsten carbide from a variety of different sources in an expeditious manner. Further the presence of carbon in the precursor facilitates carburization.

In all, the present invention provides a method to form tungsten carbide from a variety of sources and in particular from WC scrap with very low levels of impurities.

This has been a description of the present invention along with the preferred method of practicing the present invention. However, the invention itself should only be defined by the appended claims wherein

We claim:

1. A method of recycling tungsten carbide and forming tungsten carbide grains free from any binding metal comprising oxidizing tungsten carbide to form tungsten oxide;

subjecting said tungsten oxide to an acid solution to dissolve impurities and any binding metal and separating said tungsten oxide from said acid solution;

dissolving said tungsten oxide in an alkaline solution and spray drying said solution to form tungsten precursor powder;

adding a carbon containing compound to said precursor powder in an amount which provides 1% to 15% by weight of carbon relative to said precursor powder and carburizing said precursor powder.

2. The method claimed in claim 1 wherein additional carbon is provided by adding a carburizing gas having a carbon activity greater than 1.

3. The method claimed in claim 1 wherein said precursor powder is calcined prior to carburization.

4. The method claimed in claim 3 wherein said precursor is calcined in an atmosphere selected from nitrogen and diluted air at a temperature of 600 to 900° C.

5. The method claimed in claim 1 wherein said alkaline solution of tungsten is a solution of tungsten and ammonium hydroxide.

6. The method claimed in claim 5 wherein said alkaline solution of tungsten is filtered.

7. The method claimed in claim 1 wherein said compound is carburized at a temperature of 600 to 900° C. in a carburization atmosphere.

8. The method claimed in claim 7 wherein said carburization atmosphere is a mixture of carbon monoxide, hydrogen and methane containing 27% to 34% carbon monoxide, 66% to 73% hydrogen and 0% to 5% methane.

9. The method claimed in claim 1 wherein 1% to 9% by weight carbon is added to said precursor.

* * * * *